Patented Feb. 9, 1937

2,070,148

UNITED STATES PATENT OFFICE 2,070,148

PHENOLIC RESINOUS PRODUCTS AND COMPOSITIONS CONTAINING THEM

Victor H. Turkington, Caldwell, and William H. Butler, Arlington, N. J., assignors to Bakelite Corporation, New York, N. Y., a corporation of Delaware No Drawing. Application July 30, 1932, Serial No. 627,118. Renewed October 19, 1935

6 Claims. (Cl. 260—4)

This invention comprises fatty oil compositions including synthetic phenolic resinous products that are found to have the highly useful property of being compatible with the fatty oils to thereby form varnishes and other coating compositions that yield coatings characterized by toughness, flexibility, adhesiveness, durability, etc. but especially resistance to water and weak alkalies.

The commonly known resinous products obtained in the condensation of phenol or cresol with formaldehyde or equivalent methylene-containing agents have the properties of durability and resistance to water, acids and other corrosive or destructive influences which make them desirable for coating compositions; but they are not suitable as such for coating compositions on account of their hardness and brittleness, and furthermore they are known to be insoluble in fatty oils as well as susceptible to the action of alkalies. It has been proposed to make them soluble in or miscible with fatty oils by fusing them with rosin, but the presence of rosin detracts from the desirable properties of the phenolic resinous products in proportion to the relative amount present.

We have discovered that the degree of solubility or miscibility of phenolic resinous products in fatty oils depends largely on the phenolic body used in their preparation. Products obtained from phenolic bodies containing two or more benzene rings are characterized by a ready solubility or miscibility with fatty oils without the addition of a solubilizing agent or other treatment; for example, multiple ring phenolic bodies found suitable for the manufacture of oil varnishes include aryl-substituted phenols such as para-hydroxy-diphenyl, ortho - hydroxy - diphenyl, di-cresols, dithymols, etc.

Hydroxydiphenyl resinous products are particularly desirable for use with fatty oils in coating compositons on account of the excellent resistance to water and weak alkalies of the compositions so obtained. The para-hydroxydiphenyl resinous products particularly are further characterized by hardness and high melting points and therefore advantageous for coatings exposed to high temperatures; for example, their high melting points and their resistance to moisture make them desirable in coatings for furniture and the like that must withstand hot and humid atmospheric conditions and remain free from tackiness or "printing". These resinous products are further distinguished from the commonly known phenol and cresol resinous products in that they are not as readily polymerized to insoluble, infusible bodies by heating; they may be subjected to heat at temperatures as high as 200° C. and remain fusible and soluble even when the usual excess of methylene-containing agents is employed in the condensation. This tendency on the part of hydroxydiphenyl resinous products to remain unpolymerized when heated is advantageous in cooking with fatty oils to produce oil varnishes, for they do not separate out of solution or cause jelling of the entire mass as is the case with the usual phenol and cresol resinous products.

In the manufacture of oil varnishes from these resinous bodies, the resinous product can be dissolved to a clear solution in a fatty oil by heating and the heating continued until the desired viscosity or "body" is obtained. Or the condensation of the phenolic body with a methylene-containing agent can be carried out in the presence of a fatty oil, the water removed and the mass thickened to the desired viscosity. Suitable solvents, such as petroleum thinner, turpentine and other solvents commonly used in varnish, and driers if desired, are then added and after cooling the varnish so formed is ready for use. Varnishes prepared in this manner and applied as coatings give clear homogeneous films. They are fast in drying (about 20 minutes with customary solvents, to a non-tacky condition; this property in conjunction with the properties of flexibility, toughness, adhesiveness and resistance to weather and other conditions in coatings made from them peculiarly adapt them for surfacing leather, fabrics, etc., used for autotops and similar products, and for all outdoor purposes.

The unexpected qualities of the resin-oil combinations made in this manner, are indicative of a chemical reaction between the resin and the oil under the influence of heat. The extent to which even relatively small proportions of the resin affect the drying time, durability and alkali resistance points to more than a mere solution of the resin in the oil. For instance only one part of resin to four parts of tung oil yields a coating which resists 5% NaOH solution for 24 hours or longer whereas a similar proportioned oil varnish made from any of the natural resins and tung oil will be completely disintegrated in less than 30 minutes. Furthermore, there is an elimination of water during the heating which does not occur when either the oil or the resinous product is heated separately to the same degree.

The following examples illustrate the preparation of suitable resinous products, but it is to be understood that the proportions and ingredients are not limited to those specifically mentioned. All parts are by weight.

*Example 1.*—100 parts of para-hydroxydiphenyl and 100 parts of commercial formaldehyde, either with or without acid or alkaline condensing agents, are heated in a closed container under pressure to a temperature of about 120° C. or more until the condensation is substantially complete. The water is then removed by heating at atmospheric or reduced pressure. The product obtained by this procedure is a hard, clear, light colored resinous material, melting at about 150° C. or higher and is readily soluble in tung oil and other fatty oils.

Ortho-hydroxydiphenyl can be substituted for the para-hydroxydiphenyl to yield hard clear light amber colored materials which melt at about 80° C. Or the two can be mixed in varying proportions to give resinous products having any desired melting point ranging from 80° C. upward.

*Example 2.*—100 parts of para-hydroxydiphenyl and 25 parts of hexamethylenetetramine are heated together in an open vessel or in a vessel provided with a reflux condenser. The ingredients fuse at about 130° C. and react with evolution of ammonia. As the reaction proceeds, the melting point of the mass increases and very hard, high melting products are obtained if the heating is continued to 200° C. or above, which products remain soluble in fatty oils. As in the above example, ortho-hydroxy-diphenyl may be substituted in whole or in part, or the commercially available mixtures can be used to yield oil-soluble products of varying melting points.

*Example 3.*—100 parts of a hydroxy-diphenyl, 90 parts of furfural and 1 part sodium carbonate are heated together under a reflux condenser to the desired consistency. This product is soluble in fatty oils and suitable for preparing dark colored varnishes.

*Example 4.*—100 parts of a hydroxy-diphenyl, 100 parts acetaldehyde and 1 part commercial hydrochloric acid are refluxed together. The mass is dehydrated to yield an oil-soluble product.

The examples given describe synthetic resinous products prepared from phenolic bodies of higher molecular weight without admixtures; but other resinous materials, such as natural resins or novolaks, can be included either by addition to the raw ingredients or by incorporation with the finished reaction product. Among the natural resin that can be added may be mentioned rosin or colophony, copals, elemi, mastic, etc. Such additions of natural resins are mainly useful in reducing the cost of the product, but otherwise are generally undesirable as they lower the quality, greatly reduce the resistance to weathering, alkalies, etc. and increase the drying time.

In order to make a varnish, a resinous product obtained in accordance with any of the foregoing examples is, for instance, heated with about 100 parts of tung oil at about 210° C. until a sample on cooling remains clear and will stand dilution with an equal weight of cold linseed oil without clouding. Linseed oil is then added slowly holding an elevated temperature preferably about 200° C. and then holding it or gradually increasing the temperature until the desired viscosity is obtained. Further amounts of linseed oil can be included and thereupon small amounts of drier are added; for instance with 800 parts of linseed oil added, 14 parts of litharge and 2 parts of cobalt acetate are ample, the mixture being stirred well until the driers are thoroughly dissolved. Upon cooling to room temperature the composition is ready to be mixed with volatile thinners, etc. to produce commercially practical varnishes and the like.

The foregoing proportions can be varied extensively and yet have the product manifest the desirable properties noted. For instance a varnish composition with as little as 5% of an oil miscible resin as described is markedly different in rapidity of drying, resistance to moisture, weak alkalies and weathering than one from which the resin is omitted.

Although the use of tung oil as described above is advantageous, it is, however, not essential. The resinous product may be combined with linseed oil alone or other fatty oils, such as soya-bean, fish, corn, perilla, rapeseed, castor, etc. can be substituted in whole or in part; for some purposes where low viscosities are desirable, the omission of tung oil may be preferred. On the other hand, a vehicle that is suitable for paints can be obtained from tung oil alone, when properly cooked with the resinous product of a higher phenol as here indicated; this is a surprising and novel effect of decided technical importance, for raw tung oil is not usable for this purpose on account of gas checking, frosting, etc., and when cooked to the point hitherto found necessary to overcome these defects, the oil becomes too heavily bodied for brushing. But with as low an addition to tung oil as 5 per cent or even less of a resinous product of the nature described and the composition cooked at around 500° F. to a point where a sample shows gas-proofness, a vehicle results that when mixed with about one and one-half times its weight of pigment gives a paint with good brushing properties and coverage and the film dries within about two hours to a high gloss and a marked resistance to water and alkalies.

In place of first forming the resinous product and then incorporating it in oil to form a varnish, the fatty oil can be included as an ingredient of the resin reaction mass. For example, 100 parts of parahydroxydiphenyl, 100 parts commercial formaldehyde and 100 parts tung oil, with or without acid or alkaline condensing agent, are heated together in a closed vessel under pressure to about 120° C. and maintained at that temperature until condensation is substantially complete. Water is thereupon removed by heating at atmospheric or reduced pressure and the mass is further heated up to a temperature of about 200° C. until the desired consistency is reached. Metallic driers may be included if desired. When the product is dissolved in suitable solvents, a varnish is obtained that is characterized by rapid drying and excellent resistance to weathering, moisture and other destructive influences. Ortho-hydroxydiphenyl or its admixtures with para-hydroxydiphenyl can be similarly treated.

The fatty oil can be incorporated with the resinous product at intermediate stages of manufacture of the latter, while the product, for instance, is still in a liquid condition and prior to or after dehydration. As set out in the foregoing Example 3, the reaction can be arrested when the desired consistency is obtained and the oil can be included prior to dehydration which can thereafter be effected without danger of overheating or gelling of the mass. The mass can then be brought to the desired consistency or body by heating.

While the term resin or resinous product has been used for convenience in referring to the condensation product, it is evident from the disclosure that it is not to be interpreted as being restricted to the solid amorphous form; it is also inclusive of the liquid form of product. Furthermore oil-miscible products of the character here described are also obtainable with widely varying proportions of a phenolic body, methylene-containing agent and catalyst and accordingly the invention is to be given an interpretation commensurate with the appended claims.

The present application is a continuation-in-part of the Turkington et al. application No. 336,007 filed January 29, 1929 and granted as Patent No. 2,017,877, Oct. 22, 1935.

We claim:

1. As a composition of matter the product of a fatty oil incorporated with a resinous reaction product of a methylene containing agent and a hydroxydiphenyl.

2. As a composition of matter the product of a fatty oil incorporated with a reaction product of a methylene-containing agent with a phenol substituted by a single phenyl radicle.

3. As a composition of matter the product of a fatty oil incorporated with a reaction product of a methylene-containing agent and hydroxydiphenyl, said composition including a drier.

4. Method of preparing a composition suitable for coatings which comprises causing a condensation between hydroxydiphenyl and a methylene-containing agent, arresting the reaction while the mass is in a liquid condition, heating the mass with a fatty oil, and dehydrating the mass.

5. Method of preparing a composition suitable for coatings which comprises heating a condensation product of hydroxydiphenyl and a methylene-containing agent with a fatty oil until a sample upon cooling remains clear, maintaining the mixture at an elevated temperature and adding further portions of a fatty oil, and heating the mass to the desired viscosity.

6. Method of preparing a composition suitable for coatings which comprises heating the reaction product of a methylene-containing agent and hydroxydiphenyl with approximately an equal part by weight of tung oil until a sample remains clear upon cooling, maintaining the mixture at an elevated temperature, and adding a fatty oil to the mixture.

VICTOR H. TURKINGTON.
WILLIAM H. BUTLER.